United States Patent [19]
Warner et al.

[11] Patent Number: 5,636,305
[45] Date of Patent: Jun. 3, 1997

[54] MAGNETIC LOCATABLE FIGURE-8 CABLE

[75] Inventors: Bradley A. Warner, Denver, Colo.; Andrew S. Dodd, Hickory, N.C.

[73] Assignee: Siecor Corporation, Hickory, N.C.

[21] Appl. No.: 122,167

[22] Filed: Sep. 17, 1993

Related U.S. Application Data

[63] Continuation of Ser. No. 953,366, Sep. 30, 1992, abandoned.

[51] Int. Cl.$^6$ ............................................. G02B 6/44
[52] U.S. Cl. ............................................ 385/100; 385/147
[58] Field of Search ................................. 385/100, 101, 385/147

[56] References Cited

U.S. PATENT DOCUMENTS

| | | | |
|---|---|---|---|
| 4,763,983 | 8/1988 | Keith | 385/100 |
| 5,006,806 | 4/1991 | Rippingale et al. | 324/326 |
| 5,017,873 | 5/1991 | Rippingale et al. | 324/326 |
| 5,051,034 | 9/1991 | Goodman | 405/157 |
| 5,189,718 | 2/1993 | Barrett et al. | 385/101 |
| 5,305,410 | 4/1994 | Arroyo | 385/109 |
| 5,305,411 | 4/1994 | Arroyo | 385/109 |

OTHER PUBLICATIONS

"A New Twist in Fiber Optic Cable Location" By Rippingale Apr. 1991 pp. 41–44, Outside Plant.

*Primary Examiner*—Akm E. Ullah
*Attorney, Agent, or Firm*—J. David Abernethy

[57] ABSTRACT

Disclosed is a dielectric cable having two tubes separated by a web, one tube holding at least one light waveguide therein and the other tube holding a material which creates a magnetic field capable of above ground detection when the cable is buried.

3 Claims, 2 Drawing Sheets

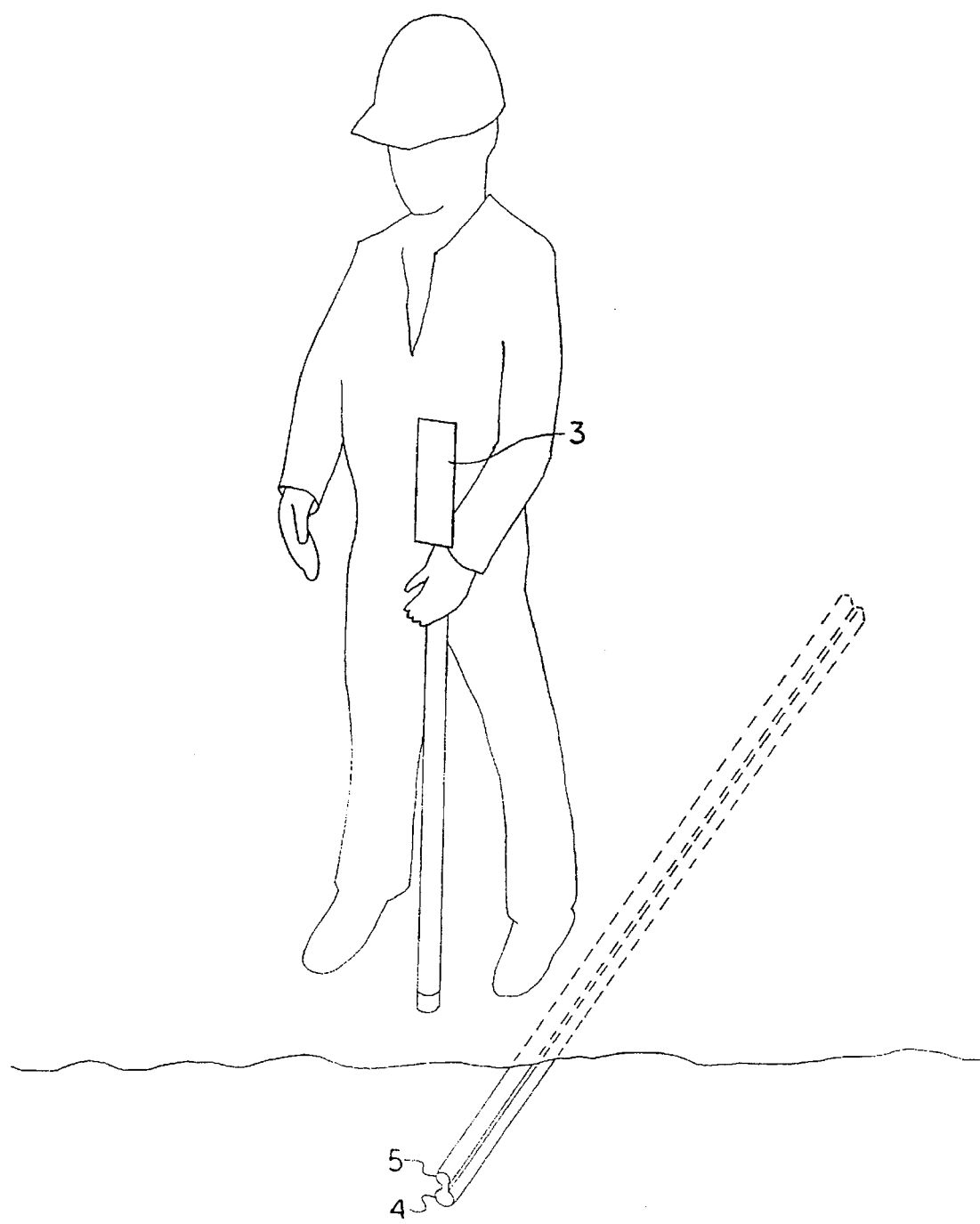

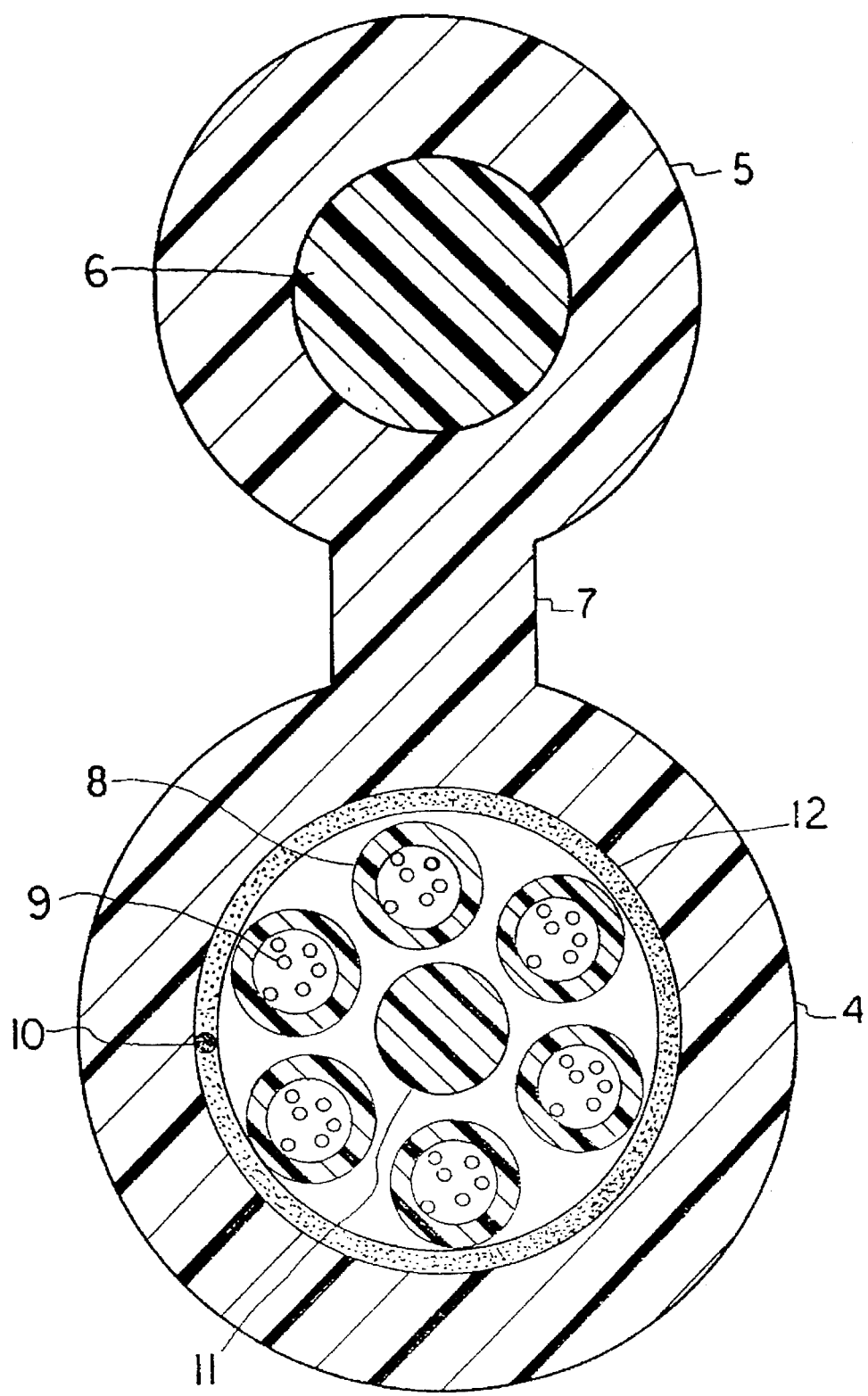

MAGNETIC LOCATABLE FIGURE-8 CABLE

This is a continuation of application Ser. NO. 07/953,366 filed on Sep. 30, 1992 now abandoned.

BACKGROUND OF THE INVENTION

The field of the invention is optical transmission cables.

Underground cables have been located in the past with the use of cable tracers. However, cable tracers require a conductor to be a part of the cable. Such tracers cannot be used with totally dielectric cables. As used in this application, the word "dielectric" means a material that is substantially non-conductive of electricity.

Many customers, particularly in areas of heavy lightning incidence such as Florida, demand cables which are totally dielectric. This requirement minimizes the risk of lightning damage, but it requires other means to locate a buried cable.

Two patents assigned to Schonstadt Instrument Company disclose the use of permanent magnet identifiers in cables to aid in the location of buried cables; see U.S. Pat. Nos. 5,017,873, and 5,006,806, said patents being incorporated herein by reference. These patents and other literature discuss the use of magnetized ducts holding a cable and in strips wound about the cable in long spirals. The use of separate ducts is expensive, however, and the use of a slow spiral tape presents a problem if the cable is too flexible, since the spiral may lose its uniformity after the cable is spooled and unspooled. The use of ducts is not ideal in many cases due to space limitations or the additional costs of manufacturing a separate duct. Adding barium ferrite powder to the outer jacket melt is also undesirable, for mixing the powder at a low enough concentration to avoid interference with the jacket's desirable properties requires resort to an undesirable jacket thickness in order to have a magnetically detectable jacket. What is apparently needed is an alternative means of making a dielectric optical transmission cable.

SUMMARY OF THE INVENTION

The cable according to the invention is a dielectric magnetically detectable cable having a figure-8 type design. The cable has a first tube and a second tube attached to each other by a web, a first dielectric material being contained within the first tube and at least one light waveguide contained within the second tube. The dielectric material produces a magnetic field which can be detected by a cable locator held above the ground surface when the cable is buried. The cable can therefore be dielectric, yet detectable by such detectors. As in conventional cables of the figure-8 design, the web maintains a non-variant orientation with respect to the first tube and also with respect to the second tube.

Although the first tube can contain magnetically detectable material in any of several forms, the preferred first dielectric material is a rod comprising barium ferrite.

A BRIEF DESCRIPTION OF THE DRAWINGS

The preferred embodiment of the invention is described with reference to the drawings, in which:

FIG. 1 is a schematic view of the cable as buried in the ground; and

FIG. 2 is a cross sectional view of the cable according to the invention.

DETAILED DESCRIPTION OF THE PREFERRED EMBODIMENT

A craftsperson is shown in FIG. 1 as holding a magnetic detection device 3, which can be obtained from Schonstadt Instrument Company. A cable having an outer jacket designated as 4 and 5 is buried beneath the surface of the ground.

A cross section of the cable according to the invention is shown in FIG. 2. Rod 6 is composed of polyethylene mixed with barium ferrite. Rod 6 contains 70% barium ferrite by weight and 30% barium ferrite by volume. Rod 6 is formed by mixing barium ferrite powder with polyethylene plastic pellets and then extruding the mixture.

In the lower portion of FIG. 2 is a glass reinforced plastic central member 11 surrounded by buffer tubes 8, each holding a plurality of optical fibers 9. Aramid fibers 12 and a rip cord 10 are also placed in this cable section.

A polyethylene jacket is extruded in a single extrusion to form a first tube 5 around rod 6, a second tube 4 around central member 11, buffer tubes 8, light waveguides 9, aramid fibers 12, and rip cord 10, and connecting first tube 5 and second tube 4 is web 7, which maintains a constant orientation with respect to both first tube 5 and second tube 4. As an example, the outer diameter of first tube 5 may be up to 10.2 millimeters, the outer diameter of second tube 4 may be 13.9 millimeters, and the thickness of the polyethylene jacket 5, 7, 4, may be 1.8 millimeters. Around 2.3 millimeters separate first tube 5 and second tube 4.

It will be clear to those skilled in the art that any customary light waveguide configuration may be found in second tube 4. The contents of second tube 4 may be of a slotted core, loose tube, ribbon cable, and/or tight buffered cable design; filling and flooding compounds may be used; and various types of strength members may be used. The cable should probably be all dielectric, since the presence of conductive elements would reduce or eliminate the need to have rod 6 present with the cable.

What is claimed is:

1. A lightwave transmission cable, comprising a first tube and a second tube attached to each other by a web, a first dielectric material contained within the first tube and at least one light waveguide contained within the second tube, the dielectric material producing a detectable magnetic field, said cable comprising only substantially dielectric materials.

2. A cable as recited in claim 1 wherein the web maintains a nonvariant orientation with respect to the first tube and with respect to the second tube.

3. A cable as recited in claim 2 wherein the first dielectric material is a rod comprising barium ferrite.

* * * * *